(12) United States Patent
Abdelmonem et al.

(10) Patent No.: US 9,294,144 B2
(45) Date of Patent: Mar. 22, 2016

(54) METHOD AND APPARATUS FOR AN ADAPTIVE FILTER ARCHITECTURE

(71) Applicant: ISCO International, LLC, Schaumburg, IL (US)

(72) Inventors: Amr Abdelmonem, Northbrook, IL (US); Sean S Cordone, Chicago, IL (US)

(73) Assignee: ISCO INTERNATIONAL, LLC, Schaumburg, IL (US)

(*) Notice: Subject to any disclaimer, the term of this patent is extended or adjusted under 35 U.S.C. 154(b) by 0 days.

(21) Appl. No.: 14/169,560

(22) Filed: Jan. 31, 2014

(65) Prior Publication Data

US 2014/0162672 A1   Jun. 12, 2014

Related U.S. Application Data

(63) Continuation of application No. 13/617,754, filed on Sep. 14, 2012, now Pat. No. 8,681,844, which is a continuation of application No. 12/268,996, filed on Nov. 11, 2008, now Pat. No. 8,385,483.

(51) Int. Cl.
*H04B 3/46* (2015.01)
*H04B 1/7103* (2011.01)
(Continued)

(52) U.S. Cl.
CPC .......... *H04B 1/7103* (2013.01); *H04B 1/1036* (2013.01); *H04B 1/7093* (2013.01);
(Continued)

(58) Field of Classification Search
CPC . H04W 52/04; H04W 64/006; H04W 72/082; H04W 72/085; H04L 5/0073; H04L 1/20; H04L 1/24; H04B 17/00; H04B 15/00; H04B 1/7103; H04B 1/1036; H04B 1/709; H04B 3/46
USPC ......................................................... 375/224
See application file for complete search history.

(56) References Cited

U.S. PATENT DOCUMENTS 3,732,500 A   5/1973   Dishal
3,781,705 A   12/1973   Dishal
(Continued)

FOREIGN PATENT DOCUMENTS

CA   2260653   1/2000
CA   2288633   4/2000
(Continued)

OTHER PUBLICATIONS

"International Search Report & Written Opinion", PCT/US01/11351, Apr. 2002.
(Continued)

*Primary Examiner* — Helene Tayong
(74) *Attorney, Agent, or Firm* — Guntin & Gust, PLC; Ed Guntin

(57) ABSTRACT

A system that incorporates teachings of the subject disclosure may include, for example, a method for identifying a spectral region in a radio frequency spectrum, determining a signal strength of the spectral region, determining a correlation factor by correlating the signal strength of the spectral region, detecting according to the correlation factor interference in the spectral region, generating coefficient data to substantially suppress the interference in the spectral region, configuring a filter according to the coefficient data to substantially suppress the interference in the spectral region and produce a digital filtered signal, and transmitting the digital filtered signal to a base station. Other embodiments are disclosed.

20 Claims, 9 Drawing Sheets

(51) Int. Cl.
*H04B 1/10* (2006.01)
*H04W 72/08* (2009.01)
*H04W 48/16* (2009.01)
*H04W 24/08* (2009.01)
*H04W 72/04* (2009.01)
*H04W 88/06* (2009.01)
*H04W 88/10* (2009.01)
*H04B 1/7093* (2011.01)
*H04J 11/00* (2006.01)
*H04B 1/707* (2011.01)
*H04L 27/00* (2006.01)

(52) U.S. Cl.
CPC ........... *H04J11/0023* (2013.01); *H04W 24/08* (2013.01); *H04W 48/16* (2013.01); *H04W 72/0453* (2013.01); *H04W 72/085* (2013.01); *H04W 88/06* (2013.01); *H04W 88/10* (2013.01); *H04B 1/707* (2013.01); *H04L 27/0006* (2013.01)

(56) References Cited

U.S. PATENT DOCUMENTS

| | | |
|---|---|---|
| 3,783,397 A | 1/1974 | Dishal |
| 3,887,222 A | 6/1975 | Hammond |
| 3,911,366 A | 10/1975 | Baghdady |
| 4,027,264 A | 5/1977 | Gutleber |
| 4,328,591 A | 5/1982 | Baghdady |
| 4,513,249 A | 4/1985 | Baghdady |
| 4,712,235 A | 12/1987 | Jones |
| 4,859,958 A | 8/1989 | Myers |
| 4,992,747 A | 2/1991 | Myers |
| 5,038,115 A | 8/1991 | Myers |
| 5,048,015 A | 9/1991 | Zilberfarb |
| 5,168,508 A | 12/1992 | Iwasaki |
| 5,185,762 A | 2/1993 | Schilling |
| 5,226,057 A | 7/1993 | Boren |
| 5,263,048 A | 11/1993 | Wade |
| 5,282,023 A | 1/1994 | Scarpa |
| 5,301,197 A | 4/1994 | Yamada et al. |
| 5,303,413 A | 4/1994 | Braegas |
| 5,307,517 A | 4/1994 | Rich |
| 5,325,204 A | 6/1994 | Scarpa |
| 5,343,496 A | 8/1994 | Honig |
| 5,497,505 A | 3/1996 | Koohgoli et al. |
| 5,500,872 A | 3/1996 | Kinney |
| 5,541,959 A | 7/1996 | Myers |
| 5,570,350 A | 10/1996 | Myer |
| 5,596,600 A | 1/1997 | Dimos |
| 5,640,146 A | 6/1997 | Campana |
| 5,640,385 A | 6/1997 | Long |
| RE35,650 E | 11/1997 | Partyka |
| 5,703,874 A | 12/1997 | Schilling |
| 5,721,733 A | 2/1998 | Wang et al. |
| 5,758,275 A | 5/1998 | Cox |
| 5,822,373 A | 10/1998 | Addy |
| 5,838,742 A | 11/1998 | Abu-Dayya |
| 5,852,630 A | 12/1998 | Langberg |
| 5,857,143 A | 1/1999 | Kataoka |
| 5,926,761 A | 7/1999 | Reed et al. |
| 5,947,505 A | 9/1999 | Martin |
| 5,949,368 A | 9/1999 | DeCesare |
| 5,960,329 A | 9/1999 | Ganesh et al. |
| 5,966,657 A | 10/1999 | Sporre |
| 5,970,105 A | 10/1999 | Dacus |
| 5,974,101 A | 10/1999 | Nago |
| 5,978,362 A | 11/1999 | Lee |
| 5,999,574 A | 12/1999 | Sun et al. |
| 6,005,899 A | 12/1999 | Khayrallah |
| 6,009,129 A | 12/1999 | Kenney et al. |
| 6,020,783 A | 2/2000 | Coppola |
| 6,035,213 A | 3/2000 | Tokuda |
| 6,038,250 A | 3/2000 | Shou et al. |
| 6,047,175 A | 4/2000 | Trompower |
| 6,052,158 A | 4/2000 | Nielsen |
| 6,104,934 A | 8/2000 | Patton |
| 6,115,409 A | 9/2000 | Upadhyay |
| 6,115,580 A | 9/2000 | Chuprun et al. |
| 6,118,805 A | 9/2000 | Bergstrom et al. |
| 6,122,309 A | 9/2000 | Bergstrom et al. |
| 6,125,139 A | 9/2000 | Hendrickson et al. |
| 6,127,962 A | 10/2000 | Martinson |
| 6,130,907 A | 10/2000 | Chen |
| 6,133,942 A | 10/2000 | Lee |
| 6,167,244 A | 12/2000 | Tomoe |
| 6,205,334 B1 | 3/2001 | Dent |
| 6,208,629 B1 | 3/2001 | Jaszewski et al. |
| 6,215,812 B1 | 4/2001 | Young |
| 6,289,004 B1 | 9/2001 | Mesecher et al. |
| 6,313,620 B1 | 11/2001 | Richardson |
| 6,327,245 B1 | 12/2001 | Satyanarayana et al. |
| 6,327,312 B1 | 12/2001 | Jovanovich |
| 6,360,077 B2 | 3/2002 | Mizoguchi |
| 6,377,606 B1 | 4/2002 | Toskala et al. |
| 6,393,284 B1 | 5/2002 | Dent |
| 6,426,983 B1 | 7/2002 | Rakib et al. |
| 6,430,164 B1 | 8/2002 | Jones |
| 6,577,670 B1 | 6/2003 | Roberts |
| 6,580,899 B1 | 6/2003 | Dalgleish et al. |
| 6,631,266 B1 | 10/2003 | Lee et al. |
| 6,671,338 B1 | 12/2003 | Gamal et al. |
| 6,704,378 B2 | 3/2004 | Jagger |
| 6,718,166 B2 | 4/2004 | Cordone |
| 6,791,995 B1 | 9/2004 | Azenkot et al. |
| 6,807,405 B1 | 10/2004 | Jagger |
| 6,843,819 B2 | 1/2005 | Suzuki et al. |
| 6,850,764 B1 | 2/2005 | Patel |
| 6,959,170 B2 | 10/2005 | Vannatta |
| 6,975,673 B1 | 12/2005 | Rouquette et al. |
| 6,976,044 B1 | 12/2005 | Kilani |
| 7,003,310 B1 | 2/2006 | Youssefmir et al. |
| 7,054,396 B2 | 5/2006 | Shan |
| 7,317,698 B2 | 1/2008 | Jagger |
| 7,359,691 B2 | 4/2008 | Adachi et al. |
| 7,457,382 B1 | 11/2008 | Jones |
| 7,477,915 B2 | 1/2009 | Leinonen et al. |
| 7,525,942 B2 | 4/2009 | Cordone |
| 7,929,953 B2 | 4/2011 | Jiang |
| 8,055,191 B2 | 11/2011 | Unger |
| 8,219,105 B2 | 7/2012 | Kronestedt et al. |
| 8,238,954 B2 | 8/2012 | Liu et al. |
| 8,412,256 B2 | 4/2013 | Lee et al. |
| 8,422,469 B2 | 4/2013 | Guvenc |
| 8,478,342 B2 | 7/2013 | Vedantham et al. |
| 8,503,938 B2 | 8/2013 | Laroia et al. |
| 8,718,024 B2 | 5/2014 | Jagger et al. |
| 8,811,552 B2 | 8/2014 | Bayesteh et al. |
| 9,008,680 B2 | 4/2015 | Abdelmonem |
| 2001/0046867 A1 | 11/2001 | Mizoguchi |
| 2002/0057751 A1 | 5/2002 | Jagger |
| 2002/0110206 A1 | 8/2002 | Becker et al. |
| 2002/0155812 A1 | 10/2002 | Takada |
| 2003/0081277 A1 | 5/2003 | Corbeil et al. |
| 2003/0123530 A1 | 7/2003 | Maeda |
| 2003/0142759 A1 | 7/2003 | Anderson et al. |
| 2003/0193366 A1 | 10/2003 | Barksdale |
| 2003/0216122 A1 | 11/2003 | Cordone |
| 2004/0042561 A1 | 3/2004 | Ho et al. |
| 2004/0048574 A1 | 3/2004 | Walker et al. |
| 2004/0088637 A1 | 5/2004 | Wada |
| 2004/0223484 A1 | 11/2004 | Xia et al. |
| 2005/0078734 A1 | 4/2005 | Baker |
| 2005/0117676 A1 | 6/2005 | Liu |
| 2007/0047494 A1 | 3/2007 | Cordone |
| 2007/0091896 A1* | 4/2007 | Liu ............................ 370/395.5 |
| 2007/0105520 A1 | 5/2007 | Van Houtum |
| 2007/0173252 A1 | 7/2007 | Jiang |
| 2007/0183483 A1 | 8/2007 | Narayan |
| 2007/0274279 A1 | 11/2007 | Wood |
| 2008/0043612 A1 | 2/2008 | Geile |
| 2008/0043657 A1 | 2/2008 | Ishii et al. |
| 2009/0161614 A1 | 6/2009 | Grandblaise |
| 2009/0233568 A1 | 9/2009 | Zhang |

(56) References Cited

U.S. PATENT DOCUMENTS

| | | |
|---|---|---|
| 2009/0325509 A1* | 12/2009 | Mattisson et al. ............ 455/75 |
| 2010/0002575 A1 | 1/2010 | Eichinger et al. |
| 2010/0029289 A1 | 2/2010 | Love et al. |
| 2010/0046374 A1 | 2/2010 | Ludwig et al. |
| 2010/0118921 A1 | 5/2010 | Abdelmonem et al. |
| 2010/0157934 A1 | 6/2010 | Tanno et al. |
| 2010/0202400 A1 | 8/2010 | Richardson |
| 2010/0220670 A1 | 9/2010 | Teo et al. |
| 2010/0227613 A1 | 9/2010 | Kim et al. |
| 2010/0246503 A1 | 9/2010 | Fox et al. |
| 2010/0255868 A1 | 10/2010 | Lee et al. |
| 2010/0279724 A1 | 11/2010 | Li et al. |
| 2010/0310026 A1 | 12/2010 | Sikri et al. |
| 2010/0315970 A1 | 12/2010 | Ramamurthi et al. |
| 2011/0014938 A1 | 1/2011 | Shekalim |
| 2011/0117967 A1 | 5/2011 | Vedantham et al. |
| 2011/0183679 A1 | 7/2011 | Moon et al. |
| 2011/0200126 A1 | 8/2011 | Bontu et al. |
| 2011/0258678 A1 | 10/2011 | Cowling et al. |
| 2011/0275399 A1 | 11/2011 | Englund et al. |
| 2011/0305306 A1 | 12/2011 | Hu et al. |
| 2011/0310747 A1 | 12/2011 | Seo et al. |
| 2012/0021753 A1 | 1/2012 | Damnjanovic et al. |
| 2012/0028663 A1 | 2/2012 | Nejatian et al. |
| 2012/0182930 A1 | 7/2012 | Sawai et al. |
| 2012/0207038 A1 | 8/2012 | Choi et al. |
| 2012/0213116 A1 | 8/2012 | Koo et al. |
| 2012/0236731 A1 | 9/2012 | Beaudin |
| 2012/0282889 A1 | 11/2012 | Tanaka et al. |
| 2013/0029658 A1 | 1/2013 | Jagger et al. |
| 2013/0058300 A1 | 3/2013 | Perets et al. |
| 2013/0090125 A1 | 4/2013 | Clifton et al. |
| 2013/0107737 A1 | 5/2013 | Lee et al. |
| 2013/0115988 A1 | 5/2013 | Sun et al. |
| 2013/0115999 A1 | 5/2013 | Sirotkin et al. |
| 2014/0169279 A1 | 6/2014 | Song et al. |
| 2014/0274100 A1 | 9/2014 | Galeev et al. |

FOREIGN PATENT DOCUMENTS

| | | |
|---|---|---|
| CN | 1173101 | 2/1998 |
| EP | 0704986 | 4/1996 |
| EP | 0812069 | 12/1997 |
| EP | 2288061 A1 | 2/2011 |
| JP | 06-061876 | 3/1994 |
| JP | 09-326713 | 12/1997 |
| WO | 98/10514 | 3/1998 |
| WO | 00/46929 | 8/2000 |
| WO | 2007/063514 | 6/2007 |
| WO | 2008033369 A2 | 3/2008 |
| WO | 2009/019074 | 2/2009 |
| WO | WO2009/019074 | 2/2009 |
| WO | 2012/0116755 | 9/2012 |
| WO | 2012/172476 | 12/2012 |
| WO | WO2012/172476 | 12/2012 |

OTHER PUBLICATIONS

Berlemann, et al., "Cognitive Radio and IVIanagement of Spectrtun and Radio Resources in Reconfigurable Networks", Wireless World Research Forum, Working Group 6 White Paper, 2005.

Milstein, , "Interference Rejection Techniques in Spread Spectrum Communications", Proceedings of the IEEE, vol. 76, No. 6, Jun. 1988.

Patent Cooperation Treaty, , "International Search Report and Written Opinion date Jun. 1, 2010, International Application No. PCT/US2009/064191".

Patent Cooperation Treaty, "International Search Report and Written Opinion dated Jun. 1, 2010, from International Application No. PCT/US2009/064191".

Poor, et al., "Narrowband Interference Suppression in Spread Spectrum COMA", IEEE Personal Communications Magazine, Third Quarter, 1994, pp. 14-27.

Salgado-Galicia, Hector et al., "A Narrowband Approach to Efficient PCS Spectrum Sharing Through Decentralized DCA Access Policies", IEEE Personal Communications, Feb. 1997, 24-34.

"Excel Average Formula/Function without including Zeros", Ozgrid.com, Aug. 8, 2011, 3 pages.

"U.S. Appl. No. 13/956,690, filed Aug. 1, 2013, pp. 4-10".

Kim, Kihong , "Interference Mitigation in Wireless Communications", Aug. 23, 2005, 133 pages.

Zyren, Jim et al., "Overview of the 3GPP Long Term Evolution Physical Layer", Freescale Semiconductor, Jul. 2007, 27 pages.

* cited by examiner

METHOD AND APPARATUS FOR AN ADAPTIVE FILTER ARCHITECTURE

PRIOR APPLICATION

This application is a continuation of U.S. patent application Ser. No. 13/617,754 filed Sep. 14, 2012, which is a continuation of U.S. patent application Ser. No. 12/268,996 filed Nov. 11, 2008 (issued as U.S. Pat. No. 8,385,483), the disclosures of all of which are incorporated herein by reference in their entirety.

FIELD OF THE DISCLOSURE

The subject disclosure is directed to a method and apparatus for an adaptive filter architecture.

BACKGROUND

The increased presence of wireless-based communication systems has spurred substantial growth in the voice and data services available to customers. Wireless networks are now frequently installed in place of traditional wired networks in office as well as home environments, and in local as well as large area networks. Typically, these networks have a base station that is allocated a radio frequency (RF) spectrum which it divides into different channel frequencies that are then used to communicate with multiple remote (often mobile) communication devices. In a cellular system, the base station may be a cellular base station and the remote devices would then be mobile handset communicators, like cellular phones, walkie-talkies, personal data assistants, etc. In a local area network, the base station may be a wireless router, such as one compliant with one or more of the various IEEE 802.11 standards, and the remote devices may be a desktop or laptop computer, wireless printer, another wireless node, etc. In any event, over time as the number of remote devices increases, the allocated spectrum for each communication system has become increasingly more crowded and the available channel frequencies more scarce.

Whereas traditional network solutions relied upon a top down approach, where the available frequency spectrum bandwidth was first identified and then channelized, more recently some have proposed bottom up approaches such as cognitive radios that proactively mine for "holes" in an available spectrum. Cognitive radios are, generally speaking, wireless communication devices that have transmission and reception characteristics that can change based on a measure of the RF environment of the device. A cognitive radio may scan a large frequency spectrum to determine what frequency bands are not in use, and then set up communications to transmit over only those identified, unused frequency bands. In other applications, cognitive radio operation may be based on environmental data such as operational rules for the network, user behavior data, user subscriber priority information, etc. Cognitive radio techniques can be used in remote stations or base stations, and generally differ from intelligent antenna systems (e.g., multiple input multiple output MIMO devices) which rely upon beamforming to avoid interference. For cognitive radios, accurate analysis of a spectral region is important to identify available bands.

Analyzing spectral regions is difficult in general; and this difficulty can vary depending on the type of wireless communication network involved. Wireless systems are often classified according to their modulation scheme, such as Time Division Multiple Access System (TDMA), Code Division Multiple Access (CDMA), etc. CDMA is a type of Direct Sequence Spread Spectrum (DSSS) modulation scheme where channels are defined by complementary, orthogonal or pseudo-random spreading sequences or codes, with each user assigned a unique spreading sequence that has a frequency much higher than that of the user's data signal. DSSS signals have spectral characteristics of bandwidth limited white noise in the RF spectrum. A typical DSSS signal is likely to have one or more interference signals present, e.g., multipath, co-channel, etc. The task of identifying interference in a DSSS signal represents a classic detection-of-signals-in-noise problem, where the "noise" that needs to be detected is in fact a signal in a spectrum whose characteristics are similar to white noise. In other words, the white noise is the signal that needs to be preserved, and the interference signal is undesired.

Cognitive radios typically employ modulations schemes such as Orthogonal Frequency-Division Multiple Access (OFDMA), which is popular for wideband digital communication and generally considered more robust than CDMA in avoiding co-channel interference. Proper analysis of the frequency spectrum is still difficult even in OFDMA-based system, because the conventional cognitive radios apply brute force algorithms to sense and manage a spectral range. For example, to save time, systems typically block out large portions of a spectral range if interference is detected there. The systems are based on avoidance algorithms. However, given the rapid growth in wireless communication systems, many of which overlap in coverage area, these avoidance algorithms "lose" too much available bandwidth to make cognitive radios practical in all situations.

DETAILED DESCRIPTION

Various examples are detailed hereinafter for an adaptive, digital architectures that can be used in radio-frequency (RF) bandpass, bandstop (notch), and other filter applications. The techniques allow for the design of adaptable wireless communication devices with improved performance through intelligent RF signal reception that may quickly identify and correct for signal interference, improve frequency channel signal-to-noise ratios, collaboratively tune a receiver to optimum frequency channels, more accurately estimate signal strength, or perform other adaptive signal processing. In some applications discussed below, the techniques are implemented in a cognitive radio wireless system capable of identifying available frequency bands within a spectral range and then communicating exclusively within those bands, so as to avoid interference between remote devices or between entire wireless systems.

By implementing the techniques in digital configurations as discussed in examples herein, wireless devices can be formed having any number of complex configurations of bandpass and bandstop (notch) filters, arranged in parallel or cascaded for sequential operation, e.g., having individual or groups of filters in series. Each of the filters may be controlled by generating coefficient data to set not only the frequency of the filter but also its bandwidth of operation. This allows for fully adaptive filters, for example, where depending on the RF environment detected by the wireless device, an adaptive filter may be changed from a bandpass to a bandstop (notch) filter and a bank of such filters may be modified from one configuration to another.

In many of the examples to follow, the techniques are described in terms of an adaptive front end controller for a wireless communication device, although it will be appreciated that these techniques may be implemented elsewhere within a wireless device as desired.

Figure 1:
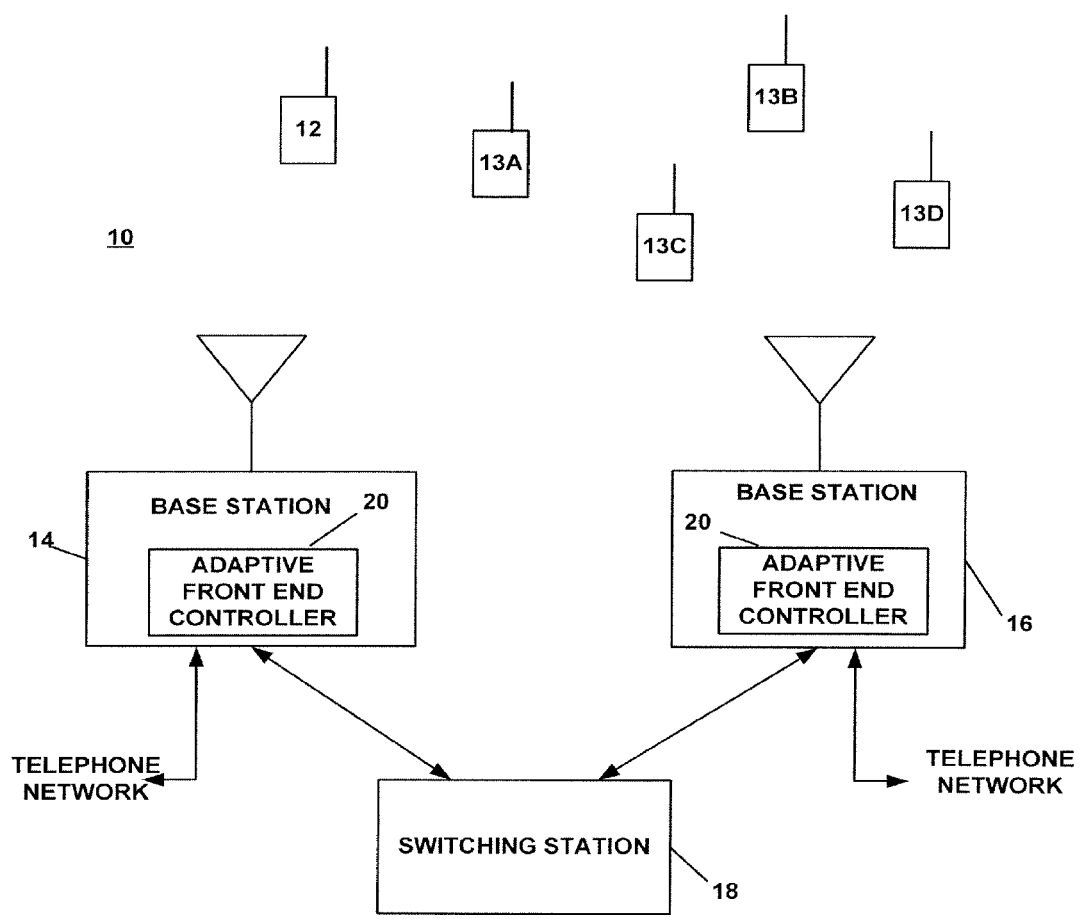
FIG. 1 is an example illustration of a communication system.

FIG. 1 illustrates an example telecommunication system 10 employing an adaptive digital filter apparatus. A plurality of remote units 12, 13A, 13B, 13C, and 13D, in this case mobile units, communicate through one of two base stations 14 and 16, interfaced together through a switching station 18. The illustrated configuration may represent a peer-to-peer topology in which remote units communicate directly with one another without the need of the base station as a central host, or (as described below) an infrastructure topology in which the base station routes all data communications. The system 10 may represent a short range or long range network. Any of the remote units 12 and 13A-13D may be a portable digital assistant (PDA), cellular phone, vehicle, media player, laptop computer, wireless supported desktop computer, gaming system, wireless networking device such as a router, switch, etc., or any other portable computing device. The base stations 14, 16 and the switching station 18 may be collectively referred to as network infrastructure.

Each base station 14, 16 includes an adaptive digital filter apparatus for intelligently analyzing an incoming RF signal (e.g., spectral region or a wideband communication signal). In this manner, the base stations 14 and 16 are considered cognitive wireless devices. However, any of the mobile units 12, 13A, 13B, 13C, and 13D and/or two base stations 14 and 16 may be designed as a cognitive wireless device, e.g., one capable of adaptively controlling transmission bands by mining for available frequencies in a particular RF spectrum.

During data communications, the mobile units 12, 13A, 13B, 13C, and 13D may exchange voice, data or other information with one of the base stations 14, 16, each of which may be connected to a conventional landline telephone network, another wireless cellular network, or other wired or wireless data network, e.g., any computer- or server-based network. As an example, information, such as voice information, transferred from the mobile unit 12 to one of the base stations 14, 16 may be coupled from the base station to a telephone network to thereby connect the mobile unit 12 with a land line telephone so that the land line telephone may receive the voice information. Conversely, information such as voice information may be transferred from a land line telephone to one of the base stations 14, 16, wherein the base station in turn transfers the information to the mobile unit 12.

The mobile units 12, 13A, 13B, 13C, and 13D and the base stations 14, 16 may exchange information in a digital format and operate under narrowband or wideband communication protocols. For example, the mobile unit 12 may be a narrowband digital unit communicating with the base station 14 as a narrowband base station using a narrowband communication protocol such as a Groupe Special Mobile (GSM) cellular network, also known as a 2G cellular communication network, with implementations known as General Packet Radio Service (GPRS), Enhanced Data rates for GSM Evolution (EDGE) and Circuit Switched Data (CSD) that each have their own corresponding encoding schemes. The mobile units 13A, 13B, 13C, and 13D may be wideband digital units that communicate with the base station 16 as a wideband base station and using a wideband communication protocol such as a DSSS signal-based protocol like CDMA or Universal Mobile Telecommunications System (UMTS), also known as a 3G cellular network. CDMA digital communication takes place using spread spectrum techniques that broadcast signals having wide bandwidths, such as, for example, 1.2288 megahertz (MHz) bandwidths. Similarly, UMTS communication takes place using bandwidths that may range from 15-20 MHz, for example. Generally, a channel having a bandwidth that is substantially smaller than that of the wideband communication signal is referred to as a narrowband channel, which in this application also refers to narrowband sub-bands which are used depending on the coding scheme.

Other examples of wideband communication protocols may be OFDMA systems that have spectral regions formed of sub-bands with varying widths, e.g., 1.25 MHz, 5 MHz, 10 MHz, or 20 MHz. The OFDMA systems may be used in applications such as cognitive radios communication in a wideband network.

The optional switching station 18 is generally responsible for coordinating the activities of the base stations 14, 16 to ensure that the mobile units 12, 13A, 13B, 13C, and 13D are constantly in communication with the base station 14, 16 or with some other base stations that are geographically dispersed. For example, the switching station 18 may coordinate communication handoffs of the mobile unit 12 between the base stations 14 and another base station as the mobile unit 12 roams between geographical areas that are covered by the two base stations.

Each base station 14, 16 has an adaptive front-end controller 20 that, as discussed further below, may contain a number of adaptive digital filters configurable into either a bandpass or bandstop configuration to modify the incoming and outgoing RF signals for the respective base station. The adaptive front-end controller 20 may perform any of a number of different intelligent functions. In some examples, the controller 20 operates as a high performance interference filter detecting interference in a spectral region and/or narrowband channel and properly tuning one or more digital filters to remove such interference.

Figure 2:
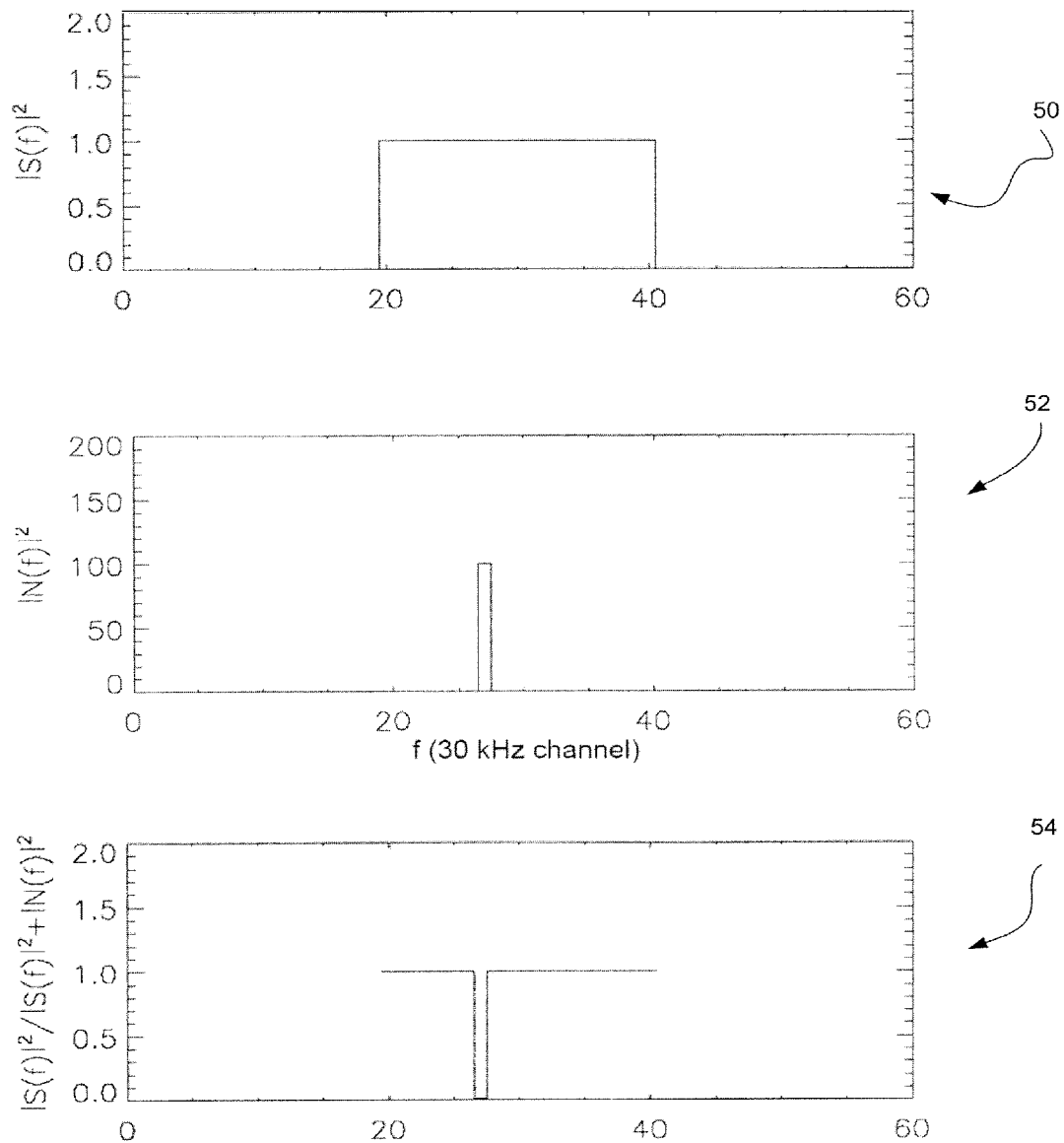
FIG. 2 is an example illustration of frequency spectrums of a DSSS signal and a narrowband digital carrier signal.

FIG. 2 illustrates a typical frequency bandwidth of a telecommunication system. In particular, FIG. 2 illustrates a frequency spectrum 50 of a 1.288 MHz DSSS system that may used by the digital mobile units 13A, 13B, 13C, and 13D to communicate with the base station 16, and a 200 kHz frequency spectrum 52 used by the module unit 12 using a narrowband digital communication system to communicate with the base station 14.

As would be understood, the digital signal shown in 52 may interfere with the frequency spectrum 50. Therefore, the adaptive front-end controller 20 in the base station 16 contains adaptive digital filters that are digitally tuned to remove the interference caused by the 200 kHz signal 52 from the DSSS signal 50, for example, by applying a transfer function given by:

$$\Phi(f) = \frac{|S(f)|^2}{|S(f)|^2 + |N(f)|^2}$$

where $|S(f)_2|$ is the power spectral density (PSD) of the desired signal and $|N(f)_2|$ is an estimate the PSD of the interference (noise) signal. If the nature of the interfering signal (noise term N) is assumed to be that given by the interference signal 52, the shape of the filter may be given, at least theoretically, by the notch frequency spectrum 54 illustrated in FIG. 2. As discussed further below, with the adaptive front-end controllers discussed herein not only can a notch (or bandstop) filter be tuned to the particular frequency corresponding to the interference frequency channel 52, the bandwidth of the notch frequency spectrum 54 can be adjusted to remove interface bands of any size. Herein, any type of interference or noise in an RF signal may be considered a type of RF characteristics that the front-end controller seeks to identify and filter before the underlying wireless device RF receiver receives that RF signal. RF characteristic also refers to any data signal that is to be identified a device, either for filtering out of an incoming RF signal or passing with an incoming RF signal, such as when the RF characteristic is a desired data signal.

The adaptive front-end controller 20 of FIG. 1 may contain a plurality of adaptive filters which would allow the base stations to filter multiple interference signals at the same time during a single clock cycle of operation.

Figure 3:
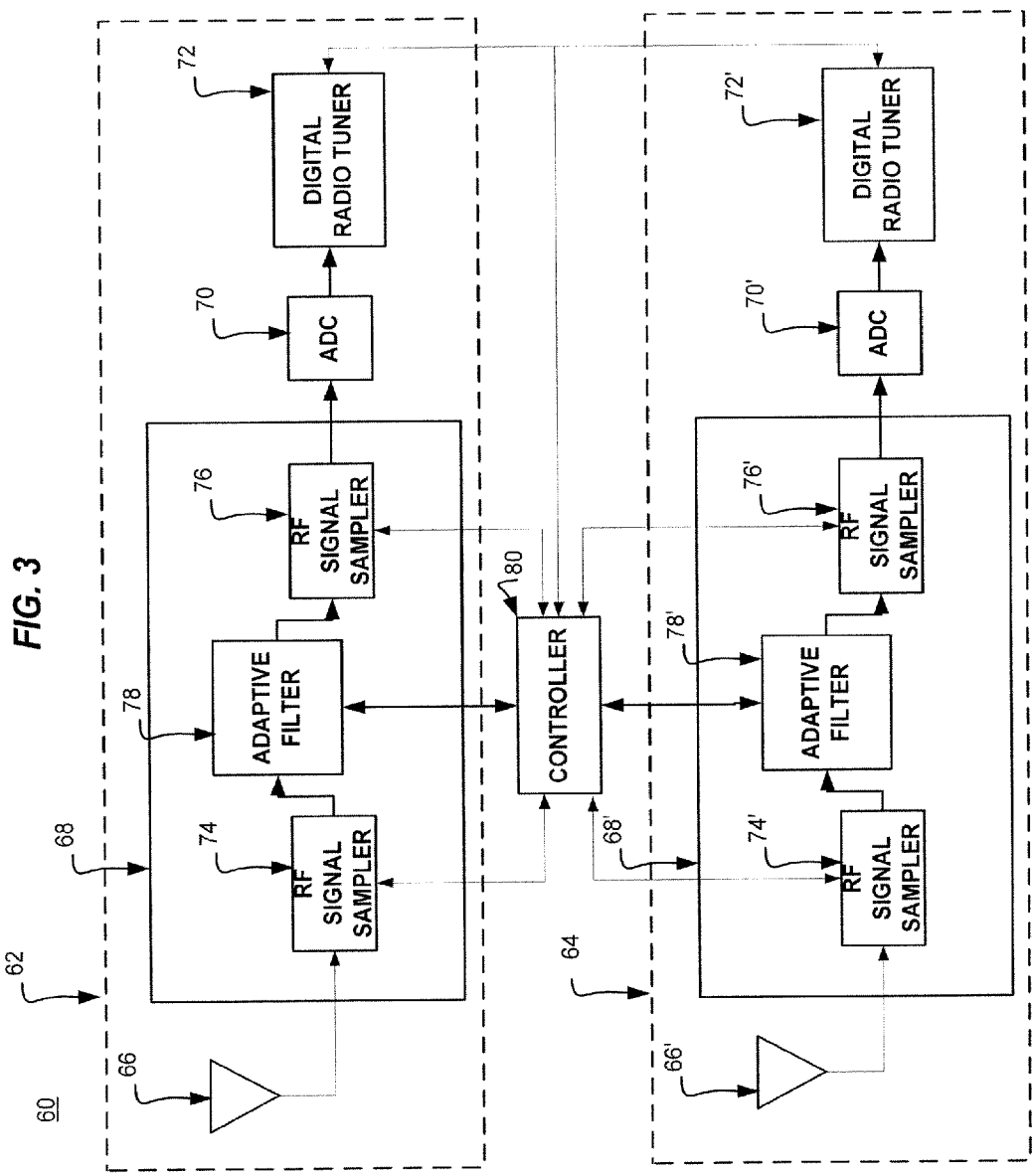
FIG. 3 is an example adaptive front-end controller used in a cognitive radio.

The adaptive front-end controller 20 is described as identifying and removing interference. However, the adaptive front-end controller can provide a number of different functions depending on the application and wireless device. FIG. 3 illustrates another example application of an adaptive front-end controller used in a wireless device 60, which may be a cellular phone, cognitive radio, or other wireless device. The radio 60 has two stages, a receiver stage 62 and a transmitter stage 64, each coupled to an antenna assembly 66, which may itself comprise one of more antennas for the radio 60. The radio 60 has a first stage coupled to the antenna assembly 66 and includes an adaptive front-end controller 68 that receives the input RF signal from the antenna and performs adaptive signal processing on that RF signal before providing the modified RF signal to an analog-to-digital converter 70, which then passes the adapted RF signal to a digital RF tuner 72.

The adaptive front-end controller 68 includes two RF signal samplers 74, 76 connected between an RF adaptive filter stage 78 that is controlled by controller 80. The adaptive filter stage 78 may have a plurality of tunable digital filters that can sample an incoming signal and selectively provided bandpass or bandstop signal shaping of that incoming signal, whether an entire wideband communication signal or a narrowband signal or various combinations of both. A controller 80 is coupled to the samplers 74, 76 and filter stage 78 and serves as an RF link adapter that along with the sampler 74 monitors the input RF signal from the antenna and determines various RF signal characteristics such as the interferences and noise within the RF signal. The controller 80 is configured to execute any number of a variety of signal processing algorithms to analyze the received RF signal, and determine an optimal filter state for the filter stage 78.

By providing tuning coefficient data to the filter stage 78, the adaptive front end controller 68 acts to pre-filter the received RF signal before that signal is sent to the RF tuner 72 (e.g., a radio tuner), which analyzes the filtered RF signal and in the case of a cognitive filter identifies available frequency bands in the filtered wideband communication (RF) signal, for tuning to a desired frequency band (or channel). Either way, after filtering, the tuner 72 may then perform its standard channel demodulation, data analysis, and local broadcasting functions. The RF tuner 72 may be considered the receiver side of an overall radio tuner, while RF tuner 72' may be considered the transmitter side of the same radio tuner.

Prior to sending the filtered RF signal (e.g., filter wideband communication signal), the sampler 76 may provide an indication of the filtered RF signal to the controller 80 in a feedback manner for further adjusting of the adaptive filter stage 78.

In some examples, the adaptive front-end controller 68 is synchronized with the RF tuner 72 by sharing a master clock signal communicated between the two. For example, cognitive radios operating on a 100 μs response time can be synchronized such that for every clock cycle the adaptive front end analyzes the input RF signal, determines an optimal configuration for the adaptive filter stage 78, filters that RF signal into the filtered RF signal and communicates the same to the tuner 72 for cognitive analysis at the radio. By way of example, cellular phones have may be implemented with a 200 μs response time on filtering. By implementing the adaptive front end controller 68 using a field programmable gate array configuration for the filter stage, wireless devices may identify not only stationary interference, but also non-stationary interference, of arbitrary bandwidths on that moving interferer.

In some examples, the controller 80 is connected directly with the tuner 72 to provide data from the signal processing algorithms directly to the radio tuner such as optimized channel specific SNR data, which the tuner may use to better identify available frequency bands within the filtered RF signal.

In some implementations, the adaptive front-end controller 68 may filter interference or noise from the received incoming RF signal and pass that filtered RF signal to the tuner 72. In other examples, such as cascaded configurations in which there are multiple adaptive filter stages, the adaptive front-end controller 68 may be configured to apply the filtered signal to an adaptive bandpass filter stage to create a passband portion of the filtered RF signal. For example, the tuner 72 may communicate information to the controller 68 to instruct the controller that the radio is only looking at a portion of an overall RF spectrum and thus to instruct the adaptive front-end controller 68 not filter only certain portions of the RF spectrum and bandpass only those portions. The integration between the tuner 72 and the adaptive front-end controller 68 may be particularly useful in dual-band and tri-band applications in which the tuner 72 is able to communicate over different wireless standards, such as both GSM or UMTS standards.

The algorithms that may be executed by the controller 80 are not limited to particular ones, although primarily interference detection and elimination is desired for most radio applications. In any event, by way of example, in some configurations the controller 80 may execute a spectral blind source separation algorithm that looks to isolate two sources from their convolved mixtures. The controller 80 may execute a signal to interference noise ratio (SINR) output estimator for all or portions of the RF signal. The controller 80 may perform bidirectional transceiver data link operations for collaborative retuning of the adaptive filter stage 78 in response to instructions from the tuner 72 or from data the transmitter stage 64. The controller 80 will of course determine the optimal filter tuning coefficient data for configuring the various adaptive filters of stage 78 to properly filter the RF signal. The controller 80 may also include a data interface communicating the tuning coefficient data to the tuner 72.

In the illustrated embodiment the filtered RF signal may be converted from a digital signal to an analog signal within the adaptive front-end controller 68. This allows the controller 68 to integrate in a similar manner to conventional RF filters. In other examples, a digital interface may be used to connect the adaptive front-end controller 68 with the tuner 72, in which case the ADC 70 would be removed.

The above discussion is in the context of the receiver stage 62. Similar elements are show in the transmitter stage 64, but bearing a prime. The elements in the transmitter stage 64 may be identical to those of the receiver 62, as shown, or different. Furthermore, some or all of these elements may in fact be executed by the same corresponding structure in the receiver stage 62. For example, the RF receiver tuner 72 and the transmitter tuner 72' may be the performed by the same single tuner device. The same may be true for the other elements, such as the adaptive filter stages 78 and 78', which may both be implemented in a single FPGA, with different filter elements in parallel for full duplex (simultaneous) receive and transmit operation.

Figure 4A:
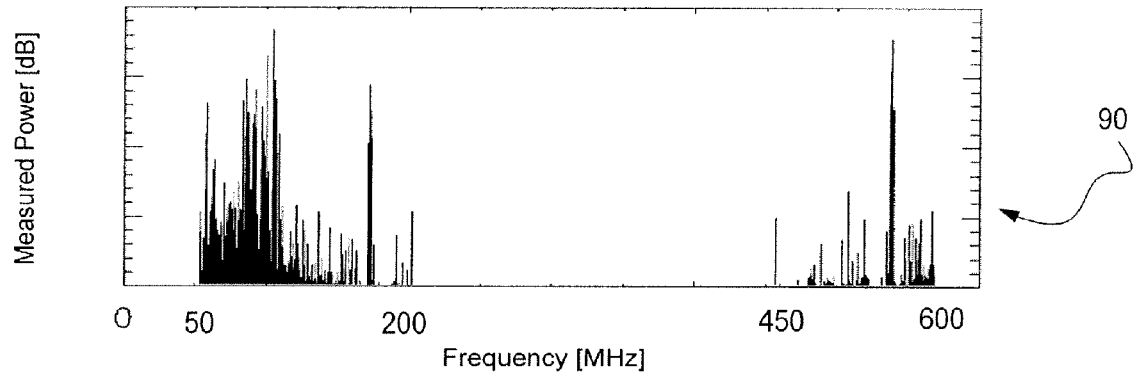
FIG. 4A is an example illustration of frequency usage in a wireless network.

The adaptive front-end controller configuration may be used in numerous applications, such as a cognitive radio system. FIG. 4A illustrates an example RF signal within which a cognitive radio is to communicate. A frequency spectrum 90 contains frequency regions that are currently in use, meaning that remote devices and base stations are communicating on frequency channels in those regions. One region is between 50 MHz and 200 MHz and another is between 450 MHz and 600 MHz. In contrast, the frequency region between 200 MHz and 450 MHz is not in use, and thus is available for communication by the cognitive radio. Under normal operations, the cognitive radio may scan the RF signal 90 and identify the entire frequency region between 200 MHz and 450 MHz as being available. However, turning to FIG. 4B, an RF signal 92, similar to the RF signal 90, contains RF characteristics 94, which in this case are interference frequency signals 94, within that available region. The signals 94 may be stationary or may hop around to different frequencies within that region. As RF characteristics, the signals 94 may represent noise or any other type of interference, including data carrying interfering signals from other wireless devices, data broadcast according to other wireless standards not currently in use a device, etc. Furthermore, these interference frequencies may be of similar or completely different bandwidths.

Ordinarily, the cognitive radio would seek to avoid the entire frequency region from 200 MHz to 450 MHz because of these interferes. However, by using an adaptive front-end controller such as discussed herein, the RF signal 92 may be filtered to remove the interference signals 94 (thus forming a filtered RF signal that looks like signal 90) before the cognitive radio begins to analyze for available frequency bands.

Figure 4B:
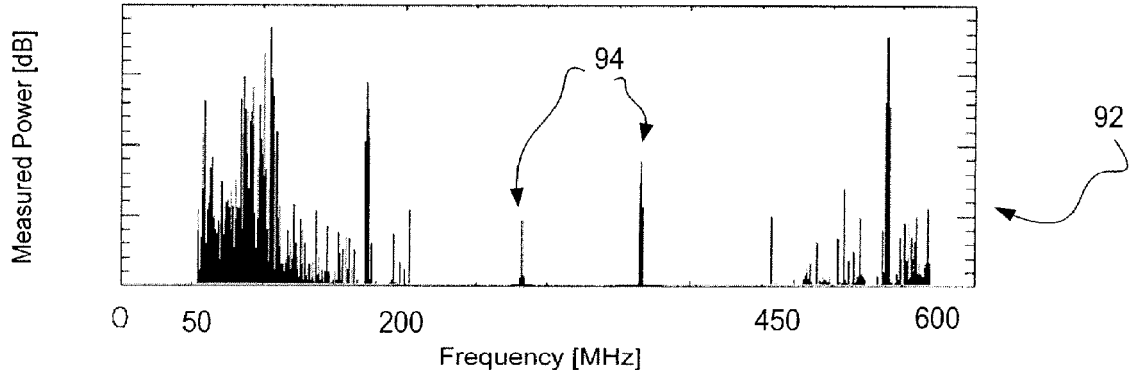
FIG. 4B is an example illustration of interference in an available frequency band.

The spectral ranges provided in FIGS. 4A and 4B are by way of example. In many applications, adaptive front end controllers may be called upon to scan from the few MHz range to 3 GHz and higher.

These techniques may be used in either single wireless communication systems or multiple band devices where multiple standards are supported. For example, some wireless communication devices known as dual- or tri-band and are capable of communicating over numerous standards, such as over GSM and UMTS depending on the available network. In some instances, operators even support and thus broadcast over multiple simultaneous systems, like GSM and UMTS. In such instances, interference may be self generated, that is, the network will inherently create interfering signals, which means that a wireless device communicating under one standard may experience data communicated simultaneously under the other standard as interference. In such instances, the techniques herein may be used to intelligently identify those interference signals (although they will contain data but from another wireless standard) and will either adaptively filter or pass those signals as not being interference signals and let the wireless device receive data from both standards. Furthermore, by having adaptive filters that may be programmed on the fly, as discussed in examples herein, a remote device can be adapted to identify and filter such interference irrespective of its current wireless standard, that is, as the device moves to a different coverage area and a different wireless standard, the same adaptive filters may be reconfigured to match the standards of that area. Of course, such configuration may be performed initially upon design as well, by having different banks of filter stages each designed for a different of the multiple supported standards.

Figure 4C:
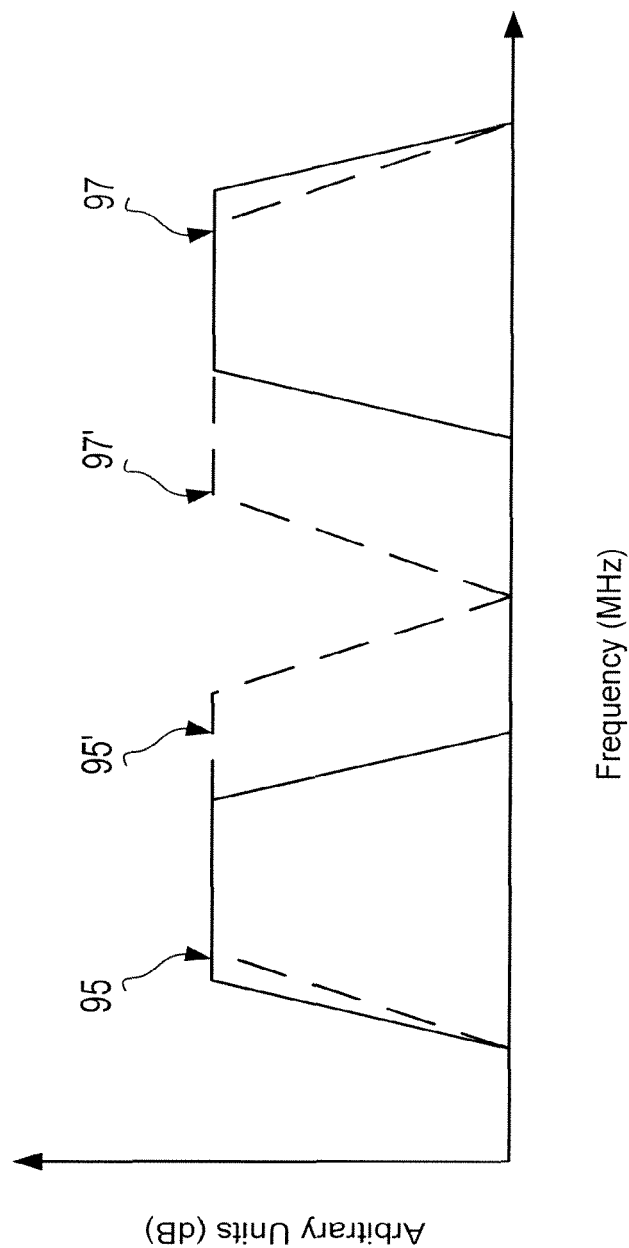
FIG. 4C is an example illustration of an RF signal spectrum containing a first wireless communication band according to a first wireless communication standard and a second wireless communication band according to second wireless communication standard.

FIG. 4C is a representation of an example RF spectrum in which heterogeneous networks are made to coexist in the same spectral range. This may occur when two different service providers have networks of the same communication standard, such as two different GSM networks, that cover the same area. In this case, the service providers are allocated different portions of the RF spectrum, for example portion 95 for one provider and portion 97 for another. Alternatively, the representation of FIG. 4C may reflect completely different heterogeneous networks, for example, where the portion 95 contains GSM signals in the coverage area and portion 97 contains UMTS signals. In either case, typically such spectral regions must be spaced far apart to avoid interference at border regions. However, with an adaptive filter stage device as discussed herein, the spectral regions can be expanded as shown in 95' and 97' because the adaptive filters can be programmed to intelligently filter interference signals at the borders of these regions so that when a device is operating under one band but receiving signals from both, the non-used any data in the non-used band adjacent the used band may be properly filtered. An example implementation is that the techniques herein will be able to prevent a 200 kHz GSM (2G) signal from interfering with a UMTS (3G) signal by using time-adaptive bandstop filters.

While this filtering is described using the term interference, it is noted that any RF characteristic may be selectively filtered or passed. For example, in such heterogeneous network situations the adaptive filter stages can be tuned to bandpass desired signals and bandstop interference signals.

In some examples, the wireless devices may identify the wireless standard themselves or be pre-programmed for particular standards. While in other cases, the wireless devices may determine the applicable standard based on header information in the received incoming RF signal, which may then identify to the wireless device the shaping or other configuration parameters for setting the adaptive filters. Such header information may already be applied for synchronizing the wireless device with the adaptive filter stage to the incoming RF signal. More broadly, the adaptive digital filter stage may be designed to any identify information in an RF signal that indicates the some characteristic of that RF signal, from which an adaptive front-end controller may use that information to generate tuning coefficients for the adaptive filters.

That identification may occur solely at the front end controller or by having the front end controller coordinate with a receiver or other device coupled thereto for analysis of the identifying information.

Figure 5:
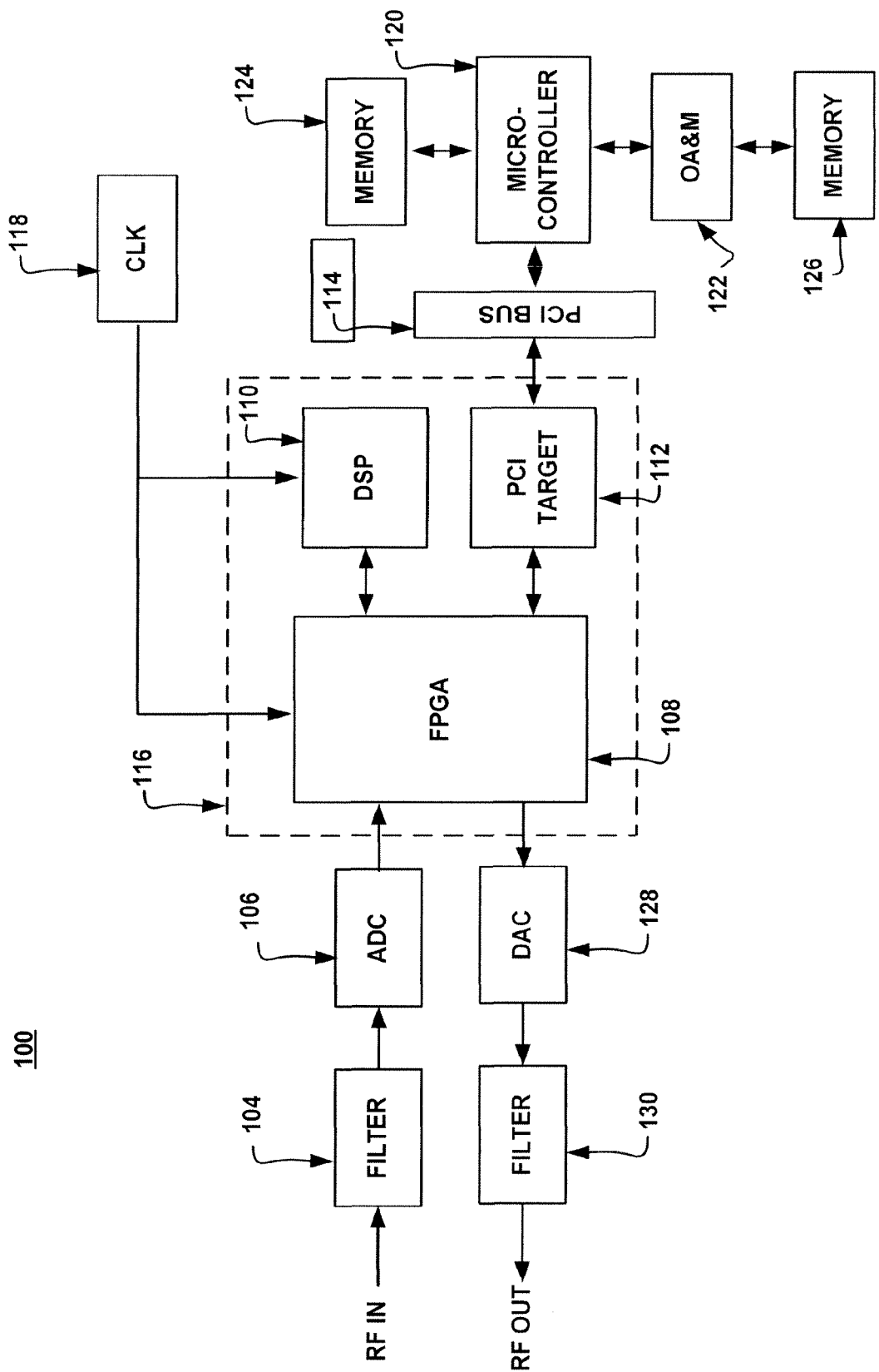
FIG. 5 is an example system level block diagram of an interference detection system.

FIG. 5 illustrates an example implementation of an adaptive front-end controller 100, e.g., as may be used for the controller 20 of FIG. 1 or controller 60 of FIG. 3. Input RF signals are received at an antenna (not shown) and coupled to an initial analog filter 104, such as low noise amplifier (LNA) block, then digitally converted via an analog to digital converter (ADC) 106, prior to the digitized input RF signal being coupled to a field programmable gate array (FPGA) 108. The adaptive filter stage described above may be implemented within the FPGA 108, which has been programmed to contain a plurality of adaptive filter elements tunable to different operating frequencies and frequency bands, and at least some being adaptive from a bandpass to a bandstop configuration or vice versa, as desired. Although an FPGA is illustrated, it will be readily understood that other architectures such as an application specific integrated circuit (ASIC) or a digital signal processor (DSP) may also be used to implement a digital filter architecture described in greater detail below.

A DSP 110 is coupled to the FPGA 108 and executes signal processing algorithms that may include a spectral blind source separation algorithm, a signal to interference noise ratio (SINR) output estimator, bidirectional transceiver data link operations for collaborative retuning of the adaptive filter stage in response to instructions from the tuner, and optimal filter tuning coefficients algorithm.

FPGA 108 is also coupled to a PCI target 112 that interfaces the FPGA 108 and a PCI bus 114 for communicating data externally. A system clock 118 provides a clock input to the FPGA 108 and DSP 110, thereby synchronizing the components. The system clock 118 may be locally set on the adaptive front-end controller, while in other examples the system claim 118 may reflect an external master clock, such as that of a radio tuner, when used in a cognitive radio application. The FPGA 108, DSP 110, and PCI target 112, designated collectively as signal processing module 116, will be described in greater detail below.

In the illustrated example, the adaptive front-end controller 100 includes a microcontroller 120 coupled to the PCI bus 114 and an operations, alarms and metrics (OA&M) processor 122. Although they are shown and described herein as separate devices that execute separate software instructions, those having ordinary skill in the art will readily appreciate that the functionality of the microcontroller 120 and the OA&M processor 122 may be merged into a single processing device. The microcontroller 120 and the OA&M processor 122 are coupled to external memories 124 and 126, respectively. The microcontroller 120 may include the ability to communicate with peripheral devices; and, as such, the microcontroller 120 may be coupled to a USB port, an Ethernet port, or an RS232 port, among others (though none shown). In operation, the microcontroller 120 may store lists of channels having interferers or a list of known typically available frequency spectrum bands, as well as various other parameters. Such a list may be transferred to the reporting and control facility or a base station, via the OA&M processor 122, and may be used for system diagnostic purposes.

Diagnostic purposes may include, but are not limited to, controlling the adaptive front-end controller 100 to obtain particular information relating to an interferer and retasking the interferer. For example, the reporting and control facility may use the adaptive front-end controller 100 to determine the identity of an interferer, such as a mobile unit, by intercepting the electronic serial number (ESN) of the mobile unit, which is sent when the mobile unit transmits information on the narrowband channel. Knowing the identity of the interferer, the reporting and control facility may contact infrastructure that is communicating with the mobile unit (e.g., the base station) and may request the infrastructure to change the transmit frequency for the mobile unit (i.e., the frequency of the narrowband channel on which the mobile unit is transmitting) or may request the infrastructure to drop communications with the interfering mobile unit altogether.

Additionally, in a cellular configuration (e.g., a system based on a configuration like that of FIG. 1) diagnostic purposes may include using the adaptive front-end controller 100 to determine a telephone number that the mobile unit is attempting to contact and, optionally handling the call. For example, the reporting and control facility may use the adaptive front-end controller 100 to determine that the user of the mobile unit was dialing 911, or any other emergency number, and may, therefore, decide that the adaptive front-end controller 100 should be used to handle the emergency call by routing the output of the adaptive front-end controller 100 to a telephone network.

The FPGA 108 provides a digital output coupled to a digital to analog converter (DAC) 128 that converts the digital signal to an analog signal which may be provided to a filter 130 to generate a clean RF output to be broadcast from the base station or mobile station. The digital output at the FPGA 108, as described, may be one of many possible outputs. For example, the FPGA 108 may be configured to output signals based on a predefined protocol such as a Gigabit Ethernet output, an open base station architecture initiative (OBSAI) protocol, or a common public radio interface (CPRI) protocol, among others.

Figure 6:
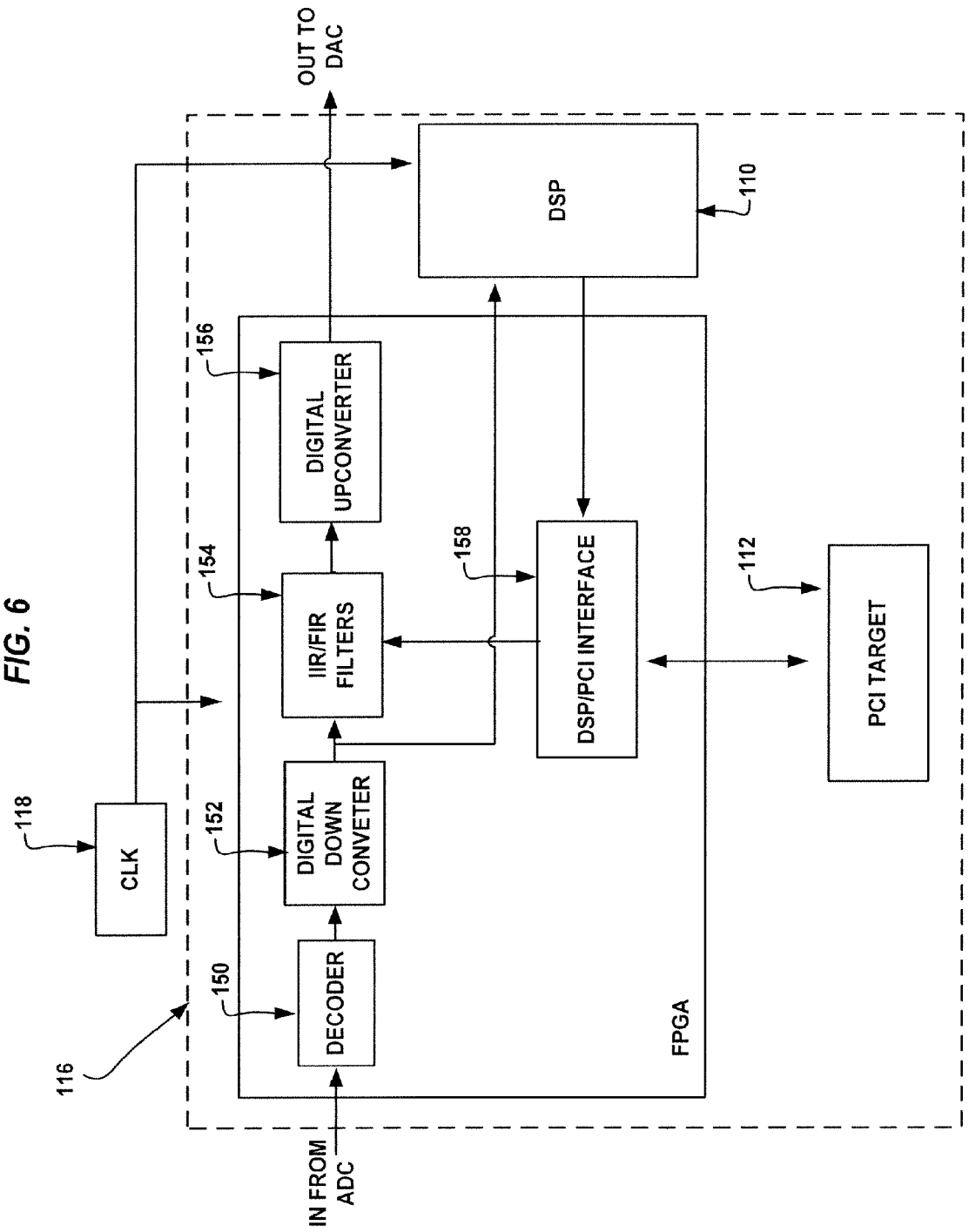
FIG. 6 is an example signal processing module.

FIG. 6 illustrates further details of an example implementation of the signal processing module 116, it being understood that other architectures may be used to implement a signal detection algorithm. A decoder 150 receives an input from the ADC 106 and decodes the incoming data into a format suitable to be processed by the signal processing module 116. A digital down converter 152, such as a polyphase decimator, down converts the decoded signal from the decoder 150. The decoded signal is separated during the digital down conversion stage into a complex representation of the input signal, that is, into I and Q components which are then are fed into a tunable infinite impulse response (IIR)/finite impulse response (FIR) filter 154. The IIR/FIR filter 154 may be implemented as multiple cascaded or parallel IIR and FIR filters. For example, the IIR/FIR filter 154 may be used with multiple filters in series, such as initial adaptive bandpass filter followed by adaptive bandstop filter. For example, the bandpass filters may be implemented as FIR filters, while the bandstop filters may be implemented as IIR filters. In an embodiment, fifteen cascaded tunable IIR/FIR filters are used to optimize the bit width of each filter. Of course other digital down converters and filters such as cascaded integrator-comb (CIC) filters may be used, to name a few. By using complex filtering techniques, such as the technique described herein, the sampling rate is lowered thereby increasing (e.g., doubling) the bandwidth that the filter 154 can handle. In addition, using complex arithmetic also provides the signal processing module 116 the ability to perform higher orders of filtering with greater accuracy.

In any case, the I and Q components from the digital down converter 152 are provided to the DSP 110 which implements a detection algorithm and in response provides the tunable IIR/FIR filter 154 with tuning coefficient data that tunes the IIR and/or FIR filters 154 to specific notch and/or bandpass frequencies, respectively, and specific bandwidths. The tuning coefficient data, for example, may include a frequency and a bandwidth coefficient pair for each of the adaptive notch filters, that instructs that corresponding filter what frequency is to be tuned for bandpass or bandstop operation and the bandwidth to be applied for that operation. In reference to FIGS. 3, 4A, and 4B for example, in implementing a cognitive radio, the tuning coefficient data corresponding to a bandpass center frequency and bandwidth may be generated by the detection algorithm and passed to a tunable FIR filter within the IIR/FIR filter 154. The filter 154 may then pass all signals located within a passband of the given transmission frequency. Tuning coefficient data corresponding to a notch filter may be generated by the detection algorithm and then applied to an IIR filter within the IIR/FIR filter 154 to remove any narrowband interference located within the passband of the bandpass filter. The tuning coefficient data generated by the detection algorithm are implemented by the tunable IIR/FIR filters 154 using mathematical techniques known in the art. For instance, the transfer function of a bandpass filter may be given by:

$$H(s) = \frac{H_o \beta s}{s^2 + \beta s + \omega_o^2}$$

where $\omega_o$ is the center frequency, $\beta$ is the bandwidth and $H_o$ is the maximum amplitude of the filter. In the case of a cognitive radio, upon implementation of the detection algorithm, the DSP 110 may determine and return coefficients corresponding to a specific frequency and bandwidth to be implemented by the tunable IR/FIR filter 154 through a DSP/PCI interface 158. Similarly, the transfer function of a notch (or bandstop) filter may also be implemented by the tunable IIR/FIR filter 154. Of course other mathematical equations may be used to tune the IIR/FIR filters 154 to specific notch or bandpass frequencies and to a specific bandwidth.

After the I and Q components are filtered to the appropriate notch or bandpass frequency and specific bandwidth, a digital upconverter 156, such as a polyphase interpolator, converts the signal back to the original data rate; and the output of the digital upconverter is provided to the DAC 128.

A wireless communication device capable to be operated as a dual- or tri-band device communicating over multiple standards, such as over GSM and UMTS may use the adaptive digital filter architecture as described above. For example, a dual-band device (using both UMTS and GSM) may be pre-programmed within the DSP 10 to transmit first on UMTS, if available, and on GSM only when outside of a UMTS network. In such a case, the IIR/FIR filter 154 may receive tuning coefficient data from the DSP 110 to pass all signals within a UMTS range. That is, the tuning coefficient data may correspond to a bandpass center frequency and bandwidth adapted to pass only signals within the UMTS range. The signals corresponding to a GSM signal may be filtered, and any interference caused by the GSM signal may be filtered using tuning coefficients, received from the DSP 110, corresponding to a notch frequency and bandwidth associated with the GSM interference signal.

Alternatively, in some cases it may be desirable to keep the GSM signal in case the UMTS signal fades quickly and the wireless communication device may need to switch communication standards rapidly. In such a case, the GSM signal may be separated from the UMTS signal, and both passed by the adaptive front-end controller. Using the adaptive digital filter, two outputs may be realized, one output corresponding to the UMTS signal and one output corresponding to a GSM signal. The DSP 110 maybe programmed to again recognize the multiple standard service and may generate tuning coefficients corresponding to realize a filter, such as a notch filter, to separate the UMTS signal from the GSM signal. In such examples, an FPGA may be programmed to have parallel adaptive filter stages, one for each communication band.

To implement the adaptive filter stages, in some examples, the signal processing module 116 is pre-programmed with general filter architecture code at the time of production, for example, with parameters defining various filter types and operation. The adaptive filter stages may then be programmed, through a user interface or other means, by the service providers, device manufactures, etc. to form the actual filter architecture (parallel filter stages, cascaded filter stages, etc.) for the particular device and for the particular network(s) under which the device is to be used. Of course, dynamic flexibility is achieved during runtime, where the filters may be programmed to different frequencies and bandwidths, each cycle, as discussed herein.

One method of detecting a wideband signal having narrowband interference is by exploiting the noise like characteristic of a signal. Due to such noise like characteristics of the signal, a particular measurement of a narrowband channel power gives no predictive power as to what the next measurement of the same measurement channel may be. In other words, consecutive observations of power in a given narrowband channel are un-correlated. As a result, if a given measurement of power in a narrowband channel provides predictive power over subsequent measurements of power in that particular channel, thus indicating a departure from statistics expected of a narrowband channel without interference, such a narrowband channel may be determined to contain interference. A method of determining such a narrowband channel having interference is illustrated in the following FIGS. 7 and 8 and is similar to the techniques described in U.S. application Ser. No. 11/217,717, filed Sep. 1, 2005, entitled "Method and Apparatus for Detecting Interference Using Correlation," which is incorporated herein by reference in its entirety.

Figure 7:
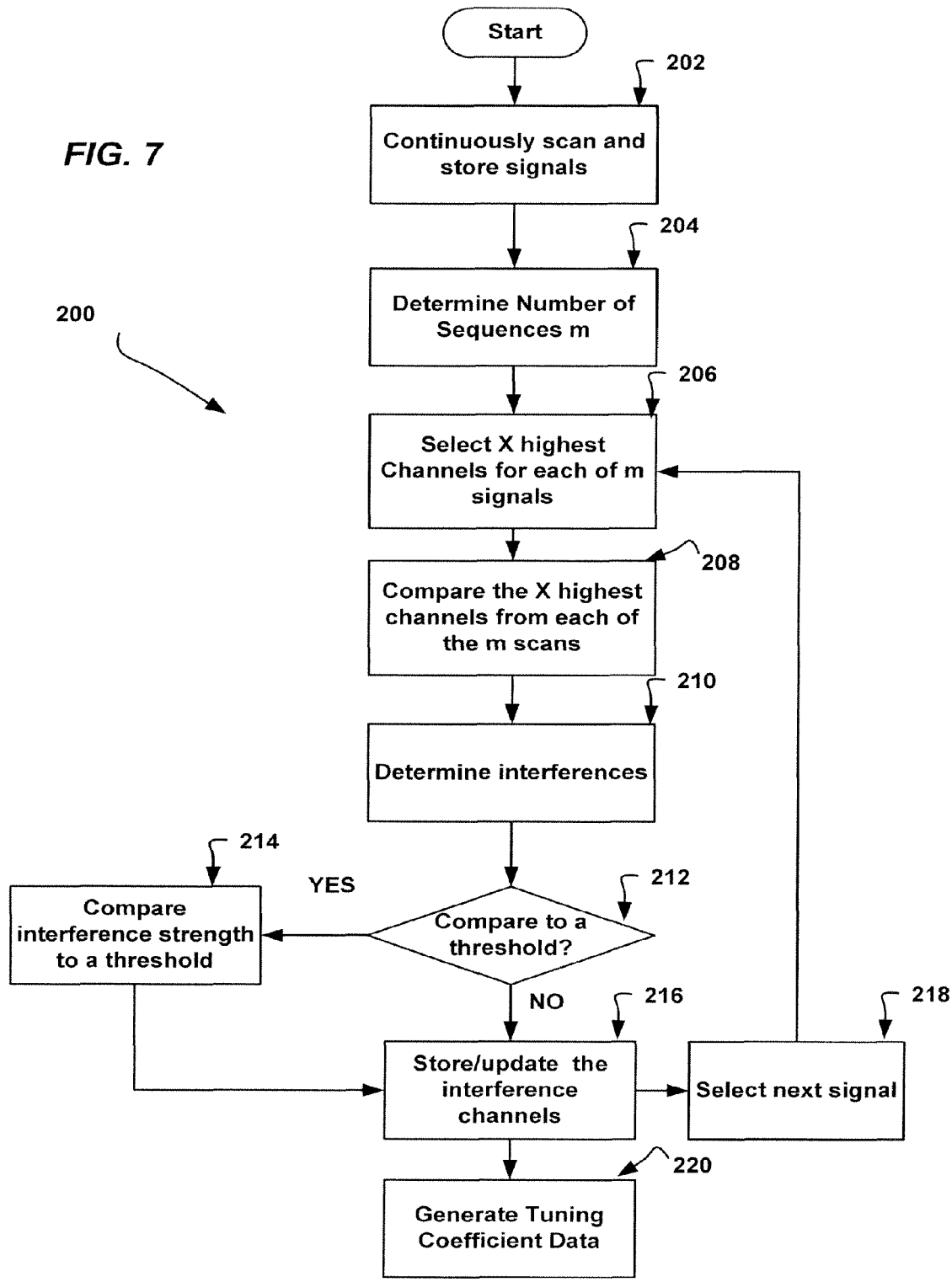
FIG. 7 is an exemplary illustration of an interference detection program.

FIG. 7 illustrates a flowchart of an interference detection program 200 that may be used by the DSP 110 to determine location of interference in a signal. A block 202 continuously scans for a series of signals and stores the observed values of the signal strengths that correspond to each of the various narrowband channels located in the signal. For example, the block 202 may continuously scan a 1.2288 MHz DSSS signal for each of forty one narrowband channels dispersed within it. Alternatively, the block 202 may continuously scan a wideband OFDMA signal for any narrowband signals which may be located within a given passband. The block 202 may be implemented by any well known DSPs used to scan and store signal strengths in a DSSS or OFDMA signal. The scanned values of narrowband signal strengths may be stored in a memory of the DSP or in any other computer readable memory. The block 202 may store the signal strength of a particular narrowband channel along with any information, such as a numeric identifier, identifying the location of that particular narrowband channel within the signal.

Subsequently, a block 204 determines a number of sequences m of a signal that may be required to be analyzed to determine narrowband channels having interference. A user may provide such a number m based on any pre-determined criteria. For example, a user may provide m to be equal to four, meaning that four consecutive signals need to be analyzed to determine if any of the narrowband channels within that signal spectrum includes an interference signal. As one of ordinary skill in the art would appreciate, the higher the selected value of m, the more accurate will be the interference detection. However, the higher the number m is, the higher is the delay in determining whether a particular signal had an interference present in it, subsequently, resulting in a longer delay before a filter, such as the tunable IIR/FIR filter 154, is applied to the signal to remove the interference signal.

Generally, detection of an interference signal may be performed on a rolling basis. That is, at any point in time, m previous signals may be used to analyze presence of an interference signal. The earliest of such m interference signals may be removed from the set of signals used to determine the presence of an interference signal on a first-in-first-out basis. However, in an alternate embodiment, an alternate sampling method for the set of signals may also be used.

Subsequently, a block 206 selects x narrowband channels having the highest signal strength from each of the m most recent signals scanned at the block 202. The number x may be determined by a user. For example, if x is selected to be equal to three, the block 206 may select three highest channels from each of the m most recent signals. The methodology for selecting x narrowband channels having highest signal strength from a signal is described in further detail in FIG. 8 below. For example, the block 206 may determine that the first of the m signals has narrowband channels 10, 15 and 27 having the highest signal strengths, the second of the m channels has narrowband channels 15 and 27 and 35 having the highest signal strengths, and the third of the m channels has the narrowband channels 15, 27 and 35 having the highest narrowband signal strength.

After having determined the x narrowband channels having the highest signal strengths in each of the m signals, a block 208 compares these x narrowband channels to determine if any of these highest strength narrowband channels appear more than once in the m signals. In case of the example above, the block 208 may determine that the narrowband channels 15 and 27 are present among the highest strength narrowband channels for each of the last three signals, while channel 35 is present among the highest strength narrowband channels for at least two of the last three signals.

Such consistent appearance of narrowband channels having highest signal strength over subsequent signals indicate that narrowband channels 15 and 27, and probably the narrowband channel 35, may have an interference signal superimposed on them. A block 210 may use such information to determine which narrowband channels may have interference. For example, based on the number of times a given narrowband channel appears in the selected highest signal strength channels, the block 210 may determine the confidence level that may be assigned to a conclusion that a given narrowband channel contains an interference signal.

Alternatively, the block 210 may determine a correlation factor for each of the various narrowband channels appearing in the x selected highest signal strength channels and compare the calculated correlation factors with a threshold correlation factor to determine whether any of the x selected channels has correlated signal strengths. Calculating a correlation factor based on a series of observations is well known to those of ordinary skill in the art. For digital signal processing, the correlation factors may be determined using autocorrelation, which is a mathematical tool for finding repeating patterns, such as the presence of a periodic signal which has been buried under noise, or identifying the missing fundamental frequency in a signal implied by its harmonic frequencies. Autocorrelation is used frequently in signal processing for analyzing functions or series of values, such as time domain signals. Informally, correlation determines the similarity between observations as a function of the time separation between them. More precisely, correlation may be achieved through the cross-correlation of a signal with itself. The threshold correlation factor may be given by the user of the interference detection program 200.

Note that while in the above illustrated embodiment, the correlation factors of only the selected highest signal strength channels are calculated, in an alternate embodiment, correlation factors of all the narrowband channels within the signals may be calculated and compared to the threshold correlation factor.

Empirically, it may be shown that when m is selected to be equal to three, for a clean signal, the likelihood of having at least one match among the higher signal strength narrowband channels is 0.198, the likelihood of having at least two matches among the higher signal strength narrowband channels is 0.0106, and the likelihood of having at least three matches among the higher signal strength narrowband channels is $9.38 \times 10^{-5}$. Thus, the higher the number of matches, the lesser is the likelihood of having a determination that one of the x channels contains an interference signal (i.e., false positive interference detection). It may be shown that if the number of scans m is increased to, say four scans, the likelihood of having such matches in m consecutive scans is even smaller, thus providing higher confidence that if such matches are found to be present, they indicate presence of interference signal in those narrowband channels.

To identify the presence of interference signals with even higher level of confidence, a block 212 may decide whether to compare the signal strengths of the narrowband channels determined to have an interference signal with a threshold. If the block 212 decides to perform such a comparison, a block 214 may compare the signal strength of each of the narrowband channels determined to have an interference with a threshold level. Such comparing of the narrowband channel signal strengths with a threshold may provide added confidence regarding the narrowband channel having an interference signal so that when a notch filter is positioned at that narrowband channel, the probability of removing a non-interfering signal is reduced. However, a user may determine that such added confidence level is not necessary and thus no such comparison to a threshold needs to be performed. In which case, the control passes to a block 216, which stores the interference signals in a memory.

After storing the information about the narrowband channels having interference signals, a block 218 selects the next signal from the signals scanned and stored at the block 202. The block 218 may cause the first of the m signals to be dropped and the newly added signal is added to the set of m signals that will be used to determine presence of an interference signal (first-in-first-out). Subsequently, control is passed to the block 206 where the process of determining narrowband channels having interference signals is repeated. Finally, a block 220 may generate tuning coefficient data which may be passed to the IIR/FIR filters 154 to realize a particular filter structure. In one embodiment, the tuning coefficient data may correspond to specific notch frequencies. In an alternative embodiment, such as, for example, a cognitive radio implementation, the tunable coefficients may correspond to a bandpass frequency and bandwidth. The tuning coefficient data may be passed to the tunable IIR/FIR filter 154, as shown in FIG. 6 to select and activate one or more IIR and/or FIR filters that are located in the path of the signal to filter out any narrowband channel identified as having narrowband interference in it.

Figure 8:
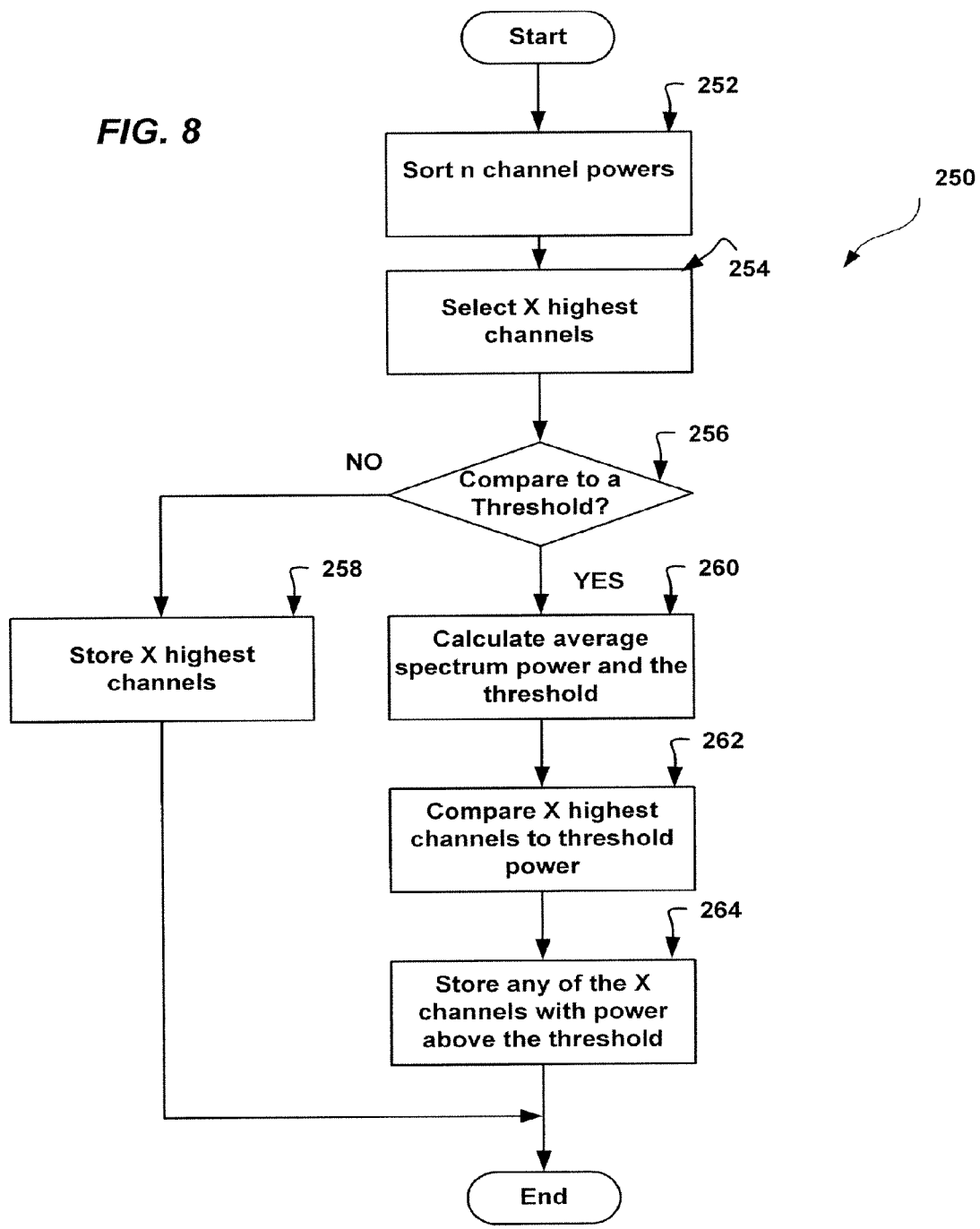
FIG. 8 is an exemplary illustration of a high strength channel detection program used by the interference detection program of FIG. 4

Now referring to FIG. 8, a flowchart illustrates a high strength channels detection program 250 that may be used to identify various channels within a given scan of the DSSS signal that may contain an interference signal. The high strength channels detection program 250 may be used to implement the functions performed by the block 206 of the interference detection program 200. In a manner similar to the interference detection program 200, the high strength channels detection program 250 may also be implemented using software, hardware, firmware or any combination thereof.

A block 252 may sort signal strengths of each of the n channels within a given DSSS signal. For example, if a DSSS signal has forty one narrowband channels, the block 252 may sort each of the 41 narrowband channels according to its signal strengths. Subsequently, a block 254 may select the x highest strength channels from the sorted narrowband channels and store information identifying the selected x highest strength channels for further processing. An embodiment of the high strength channels detection program 250 may simply use the selected x highest strength channels from each scan of the DSSS signals to determine any presence of interference in the DSSS signals. However, in an alternate embodiment, additional selected criteria may be used.

Subsequently, a block 256 determines if it is necessary to compare the signal strengths of the x highest strength narrowband channels to any other signal strength value, such as a threshold signal strength, etc., where such a threshold may be determined using the average signal strength across the DSSS signal. For example, the block 256 may use a criterion such as, for example: "when x is selected to be four, if at least three out of four of the selected narrowband channels have also appeared in previous DSSS signals, no further comparison in necessary." Another criterion may be, for example: "if any of the selected narrowband channels is located at the fringe of the DSSS signal, the signal strengths of such narrowband channels should be compared to a threshold signal strength." Other alternate criteria may also be provided.

If the block 256 determines that no further comparison of the signal strengths of the selected x narrowband channels is necessary, control is passed to a block 258, which stores information about the selected x narrowband channels in a memory for further processing. If the block 256 determines that it is necessary to apply further selection criteria to the selected x narrowband channels, control is passed to a block 260. The block 260 may determine a threshold value against which the signal strengths of each of the x narrowband channels are compared based on a predetermined methodology.

For example, in an embodiment, the block 260 may determine the threshold based on the average signal strength of the DSSS signal. The threshold signal strength may be the average signal strength of the DSSS signal or a predetermined value may be added to such average DSSS signal to derive the threshold signal strength.

Subsequently, a block 262 may compare the signal strengths of the selected x narrowband channels to the threshold value determined by the block 260. Only the narrowband channels having signal strengths higher than the selected threshold are used in determining presence of interference in the DSSS signal. Finally, a block 264 may store information about the selected x narrowband channels having signal strengths higher than the selected threshold in a memory. As discussed above, the interference detection program 200 may use such information about the selected narrowband channels to determine the presence of interference signal in the DSSS signal.

The interference detection program 200 and the high strength channel detection program 250 may be implemented by using software, hardware, firmware or any combination thereof. For example, such programs may be stored on a memory of a computer that is used to control activation and deactivation of one or more notch filters. Alternatively, such programs may be implemented using a digital signal processor (DSP) which determines the presence and location of interference channels in a dynamic fashion and activates/deactivates one or more notch filters.

Accordingly, this description is to be construed as illustrative only and not as limiting to the scope of the invention. The details of the methodology may be varied substantially without departing from the spirit of the invention, and the exclusive use of all modifications, which are within the scope of the appended claims, is reserved.

What is claimed is:

1. A method comprising:
    identifying, by a system including a processor, a spectral region in a radio frequency spectrum independent of there being interference in the spectral region;
    determining, by the system, a signal strength of the spectral region;
    determining, by the system, a correlation factor by correlating the signal strength of the spectral region, wherein the determining of the correlation factor comprises determining correlation factors for a group of higher signal strengths without determining correlation factors for a group of lower signal strengths;
    detecting, by the system according to the correlation factor, interference in the spectral region;
    generating, by the system, coefficient data that corresponds to a bandpass frequency; and
    configuring, by the system, a filter according to the coefficient data to substantially suppress the interference in the spectral region and to produce a digital filtered signal, wherein the configuring of the filter includes activating at least one target filter of a group of target filters, and wherein the group of target filters includes at least one infinite impulse response filter or finite impulse response filter.

2. The method of claim 1, comprising formatting, by the system, the digital filtered signal for transmission according to a Gigabit Ethernet protocol, an Open Base Station Architecture Initiative (OBSAI) protocol, or a Common Public Radio Interface (CPRI) protocol.

3. The method of claim 1, comprising transmitting, by the system, the digital filtered signal to a base station.

4. The method of claim 1, comprising formatting, by the system, the digital filtered signal according to a Gigabit Ethernet protocol.

5. The method of claim 1, comprising formatting, by the system, the digital filtered signal according to an Open Base Station Architecture Initiative (OBSAI) protocol.

6. The method of claim 1, comprising formatting, by the system, the digital filtered signal according to a Common Public Radio Interface (CPRI) protocol.

7. The method of claim 1, wherein the system is located in a base station.

8. A method, comprising:
    selecting, by a system including a processor, an available frequency band for engaging in communications independent of there being interference in the available frequency band;
    determining, by the system, a signal strength for each of a plurality of narrowband channels in the available frequency band;
    determining, by the system, a correlation factor for at least a portion of the plurality of narrowband channels based on correlating of the signal strength, wherein the determining of the correlation factor comprises determining correlation factors for a group of higher signal strengths without determining correlation factors for a group of lower signal strengths;

identifying, by the system from the correlation factor, narrowband interference in a narrowband channel of the plurality of narrowband channels;

generating, by the system, tuning coefficient data based on the narrowband interference; and configuring, by the system, a filter according to the tuning coefficient data to substantially suppress the narrowband interference in the narrowband channel and to produce a digital filtered signal.

9. The method of claim 8, comprising transmitting, by the system, the digital filtered signal to a base station.

10. The method of claim 9, wherein the system is located in a mobile device that is communicatively coupled to the base station.

11. The method of claim 8, wherein the system is located in a cellular base station.

12. The method of claim 8, comprising formatting, by the system, the digital filtered signal for transmission according to one of a Gigabit Ethernet protocol, an Open Base Station Architecture Initiative (OBSAI) protocol or a Common Public Radio Interface (CPRI) protocol.

13. The method of claim 8, wherein the configuring of the filter comprises tuning the filter to a filter frequency and a filter bandwidth according to the tuning coefficient data, wherein the filter comprises a plurality of filter elements that are arranged in parallel or in a cascaded configuration.

14. The method of claim 8, wherein the determining of the correlation factor comprises repeating a determination of the signal strength for each of the plurality of narrowband channels in the available frequency band.

15. A system, comprising:

a filter apparatus; and a circuit coupled to the filter apparatus, wherein execution of instructions by the circuit causes the circuit to perform operations comprising:

selecting portions of a spectral region for engaging in a communication session independent of there being interference in the portions of the spectral region;

determining a signal strength for a plurality of channels corresponding to the portions of the spectral region;

determining a correlation factor by a correlation of the signal strength;

identifying from the correlation factor a channel of the plurality of channels experiencing interference;

generating coefficient data based on the interference; and configuring the filter apparatus by tuning the filter apparatus to a filter frequency and a filter bandwidth according to the coefficient data to substantially suppress the interference and to produce a digital filtered signal, wherein the determining of the correlation factor comprises determining correlation factors for a group of higher signal strengths without determining correlation factors for a group of lower signal strengths.

16. The system of claim 15, wherein the system is located in a cellular base station.

17. The system of claim 15, wherein the filter apparatus comprises a plurality of filter elements.

18. The system of claim 17, wherein the plurality of filter elements are arranged in a parallel configuration.

19. The system of claim 17, wherein the plurality of filter elements are arranged in a cascaded configuration.

20. The system of claim 15, wherein the system is located in a mobile device that is communicatively coupled to a cellular base station, and wherein the operations further comprise transmitting the digital filtered signal to the cellular base station.

* * * * *